(12) United States Patent
Jones et al.

(10) Patent No.: US 8,930,637 B2
(45) Date of Patent: Jan. 6, 2015

(54) ARRANGEMENT

(75) Inventors: Andrew Michael Jones, Bristol (GB); Stuart Ryan, Bristol (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 71 days.

(21) Appl. No.: 13/489,920

(22) Filed: Jun. 6, 2012

(65) Prior Publication Data

US 2013/0103912 A1   Apr. 25, 2013

(30) Foreign Application Priority Data

Jun. 6, 2011   (GB) .................................. 1109447.1

(51) Int. Cl.
*G06F 12/08*   (2006.01)
*G06F 13/16*   (2006.01)

(52) U.S. Cl.
CPC ........ *G06F 12/0891* (2013.01); *G06F 13/1663* (2013.01); *G06F 12/0815* (2013.01); *G06F 12/0817* (2013.01)
USPC ........................................................ 711/145

(58) Field of Classification Search
CPC ............ G06F 12/0815; G06F 12/0817; G06F 12/0891; G06F 13/1663

USPC .................................................. 711/141–145
See application file for complete search history.

(56) References Cited

U.S. PATENT DOCUMENTS

| | | | |
|---|---|---|---|
| 6,321,304 B1 | 11/2001 | James | |
| 6,330,643 B1 | 12/2001 | Arimilli et al. | |
| 7,177,987 B2 * | 2/2007 | Van Doren et al. | 711/146 |
| 7,213,106 B1 * | 5/2007 | Koster et al. | 711/119 |
| 7,395,374 B2 * | 7/2008 | Tierney et al. | 711/141 |
| 7,783,716 B2 * | 8/2010 | Hayward | 709/213 |
| 7,802,058 B1 * | 9/2010 | Miller et al. | 711/141 |
| 2003/0023783 A1 | 1/2003 | Arimilli et al. | |
| 2005/0160230 A1 * | 7/2005 | Doren et al. | 711/141 |
| 2012/0200585 A1 * | 8/2012 | Offen et al. | 345/557 |

* cited by examiner

*Primary Examiner* — Hiep Nguyen
(74) *Attorney, Agent, or Firm* — Allen, Dyer, Doppelt, Milbrath & Gilchrist, P.A.

(57) ABSTRACT

An arrangement includes a first part and a second part. The first part includes a memory controller for accessing a memory, at least one first cache memory and a first directory. The second part includes at least one second cache memory configured to request access to said memory. The first directory is configured to use a first coherency protocol for the at least one first cache memory and a second different coherency protocol for the at least one second memory.

31 Claims, 5 Drawing Sheets

| Directory Cache ID | Block ID | Local cache | I or M |
|---|---|---|---|
| 1 | x | A | M |
| 2 | N/A | N/A | I |
| 3 | N/A | N/A | I |
| 4 | N/A | N/A | I |

*FIG. 4*

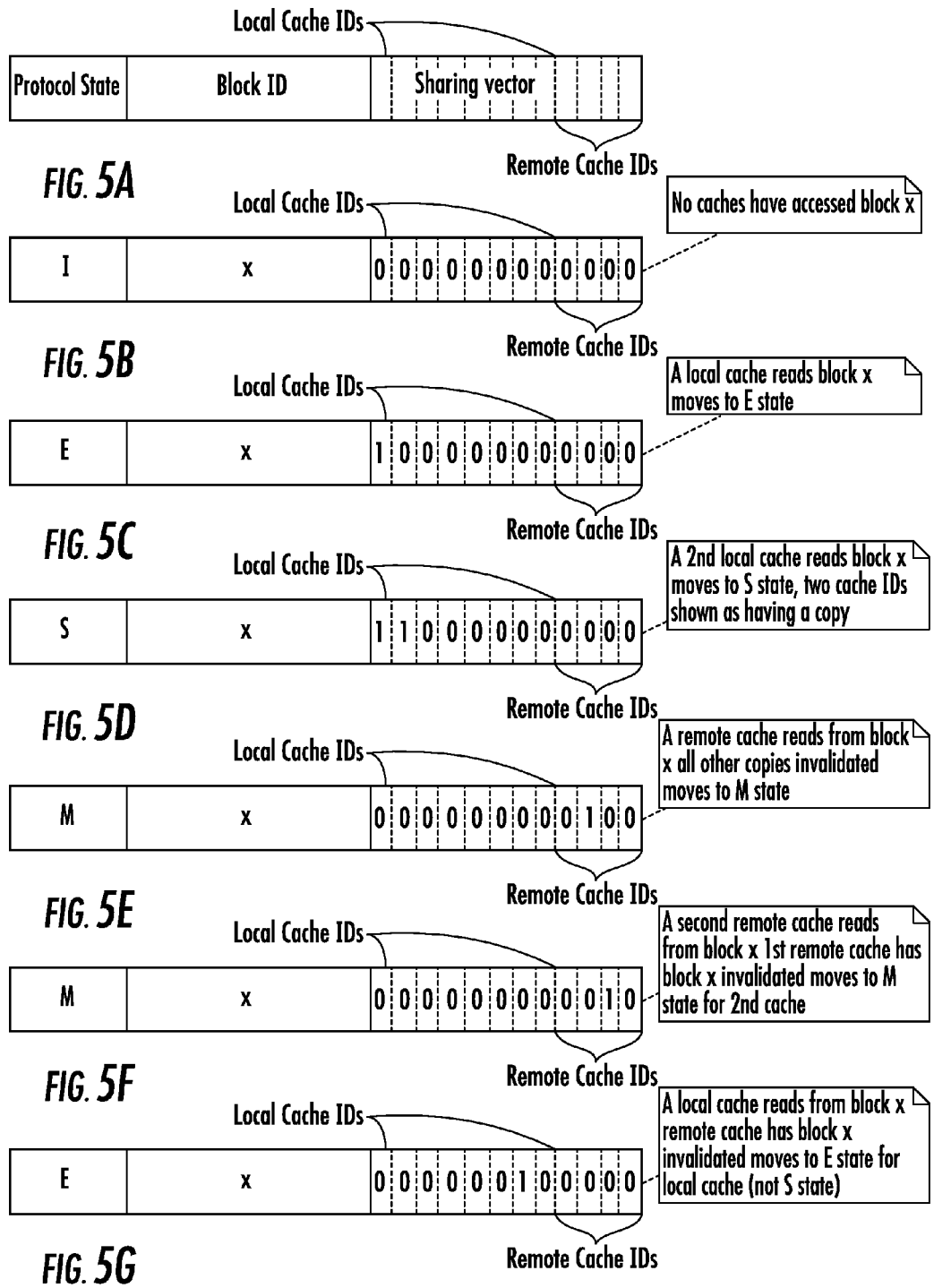

ARRANGEMENT

CROSS REFERENCE TO RELATED APPLICATIONS

This application claims the priority benefit of Great Britain patent application number 1109447.1, filed on Jun. 6, 2011, which is hereby incorporated by reference to the maximum extent allowable by law.

BACKGROUND

1. Technical Field

Embodiments relate to an arrangement with a first part and a second part. In particular, but not exclusively, embodiments relate to an arrangement comprising a first die and a second die.

2. Discussion of the Related Art

In an arrangement with more than one cache memory, there may be a performance advantage to be gained by supporting a hardware coherence system. A hardware coherence system may remove the task from software of ensuring that, for example, a CPU or peripheral has the most up-to-date copy of data in a memory location. Without a hardware coherence system, software may have to perform cycle consuming cache maintenance operations.

A coherence system may be made up of an underlying hardware mechanism and a protocol built on top of the hardware. Examples of cache coherence protocols include the MESI (modified, exclusive, shared, invalid) protocol. Other examples of protocols are available. Some hardware mechanisms use a snooping system or a directory system.

SUMMARY

According to one embodiment there is provided an arrangement comprising: a first part comprising a memory controller for accessing a memory, at least one first cache memory and a first directory; and a second part comprising at least one second cache memory configured to request access to said memory, wherein said first directory is configured to use a first coherency protocol for said at least one first cache memory and a second different coherency protocol for said at least one second cache memory.

The second different coherency protocol may be configured to have only modified and invalid states.

The first coherency protocol may be configured to have a modified state, an invalid state and at least one other state. The at least one other state may comprise at least one of a exclusive state and a shared state.

The second different coherency protocol may be such that if a second cache memory transaction is in respect of a first address, no other cache memory is permitted to retain data from said first address of said memory.

The first directory may be configured such that any other entry for said first address has an invalid state. The first directory may be configured to allocate to each cache transaction from said at least one second cache memory one of a set of reserved cache identities used only for transactions from said at least one second cache memory.

Each allocated cache identity may be associated with a one transaction. The second part may comprise a second directory.

The first directory may be configured to use an algorithm to allocate a cache identity for a transaction from a second cache memory, store said allocated cache identity and address information associated with said transaction, and said second directory may be configured to use a same algorithm to allocate a same cache identity for said transaction from said second cache memory, store said allocated cache memory identity, address information associated with said transaction and a true cache identity of said second cache memory.

The arrangement may comprise at least one memory management unit comprising information indicating which parts of said memory are potentially shareable.

The use of said first or second coherency protocols may be triggered in response to a transaction for an address in a potentially shared part of said memory.

The arrangement may comprise a link between said first and second parts, wherein said link may comprise a first virtual channel for transactions from at least one second cache memory to a non shared part of said memory and a second virtual channel for transactions from at least one second cache memory to a potentially shared part of said memory.

The arrangement may comprise a link between said first and second parts, said link may comprise a virtual wire channel for carrying information between a plurality of wires associated with said first directory and a corresponding plurality of wires associated with said second directory.

A first set of said plurality of wires associated with said first directory may be for sending purge information to a second set of said plurality of wires associated with said second directory.

A third set of said plurality of wires associated with said second directory may be for sending purge acknowledgment information to a fourth set of said plurality of wires associated with said first directory.

At least one of said first, second, third and fourth sets of wires may comprise a separate wire for each allocatable cache identity.

The first directory may comprise a first port for transactions from said at least one first cache memory and a second port for transactions from said at least one second cache memory.

The first and second parts may comprise first and second dies.

The arrangement may be in combination with said memory.

There is provided according to a second embodiment an arrangement comprising a first part comprising a memory controller for accessing a memory, and a first directory; and a second part comprising at least one cache memory configured to request access to said memory, wherein said first directory is configured to allocate to each cache transaction from said at least one cache memory one of a set of reserved cache identities used only for transactions from said at least one cache memory of said second part.

There is provided according to a third embodiment an arrangement comprising: a first part comprising a memory controller for accessing a memory, and a first directory, and a second part comprising at least one cache memory configured to request access to said memory and a second directory, wherein said first directory is configured to use an algorithm to allocate a cache identity for a transaction from a cache memory, store said allocated cache identity and address information associated with said transaction, and said second directory is configured to use a same algorithm to allocate a same cache identity for said transaction from said cache memory, store said allocated cache memory identity, address information associated with said transaction and a true cache identity of said cache memory.

There is provided according to a fourth embodiment an arrangement comprising: a first part comprising a memory controller for accessing a memory, and a first directory, a second part comprising at least one cache memory configured to request access to said memory, a link between said first and second parts, wherein said link comprises a first virtual channel for transactions from said at least one cache memory to a non shared part of said memory and a second virtual transaction for transactions from said at least one cache memory to a potentially shared part of said memory.

There is provided according to a fifth embodiment an arrangement comprising: a first part comprising a memory controller for accessing a memory, and a first directory, a second part comprising at least one cache memory configured to request access to said memory and a second directory, a link between said first and second parts, said link comprising a virtual wire channel for carrying information between a plurality of wires associated with said first directory and a corresponding plurality of wires associated with said second directory.

There is provided according to a sixth embodiment a method comprising: receiving in a first directory a first transaction from a first local cache memory requesting access to a memory and applying a first cache coherency protocol to said first transaction; and receiving in said second directory a second transaction from a second remote cache memory requesting access to said memory and applying a second different coherency protocol to said second transaction.

There is provided according to a seventh embodiment a method comprising: allocating in a first directory, in a first part, to each cache transaction from at least one cache memory, in a second part, one of a set of reserved cache identities used only for transactions from said at least one cache memory of said second part.

There is provided according to an eighth embodiment a method comprising: using an algorithm in a first directory to allocate a cache identity for a transaction from a cache memory, storing in said first directory said allocated cache identity and address information associated with said transaction, using a same algorithm in a second directory to allocate a same cache identity for said transaction from said cache memory, and storing said allocated cache memory identity, address information associated with said transaction and a true cache identity of said cache memory.

There is provided according to a ninth embodiment a method comprising: using a first virtual channel of a link for transactions from at least one cache memory to a non shared part of said memory, said memory being accessible via one part, said at least one cache memory being on a second part and said link being between said first part and said second part; using a second virtual channel of said link for transactions from said at least one cache memory to a potentially shared part of said memory.

There is provided according to a tenth embodiment a method comprising: using a virtual wire channel of a link to carrying information between a plurality of wires associated with a first directory and a corresponding plurality of wires associated with a second directory, said first directory being on a first part, said second directory being on a second part, and said link being between said first part and said second part.

BRIEF DESCRIPTION OF THE DRAWINGS

For a better understanding of some embodiments, reference will be made by way of example only to the accompanying drawings in which:

FIG. 4 shows a table in a slave directory;
and
FIG. 5 shows entries in a master directory and state changes.

DETAILED DESCRIPTION

Figure 1:
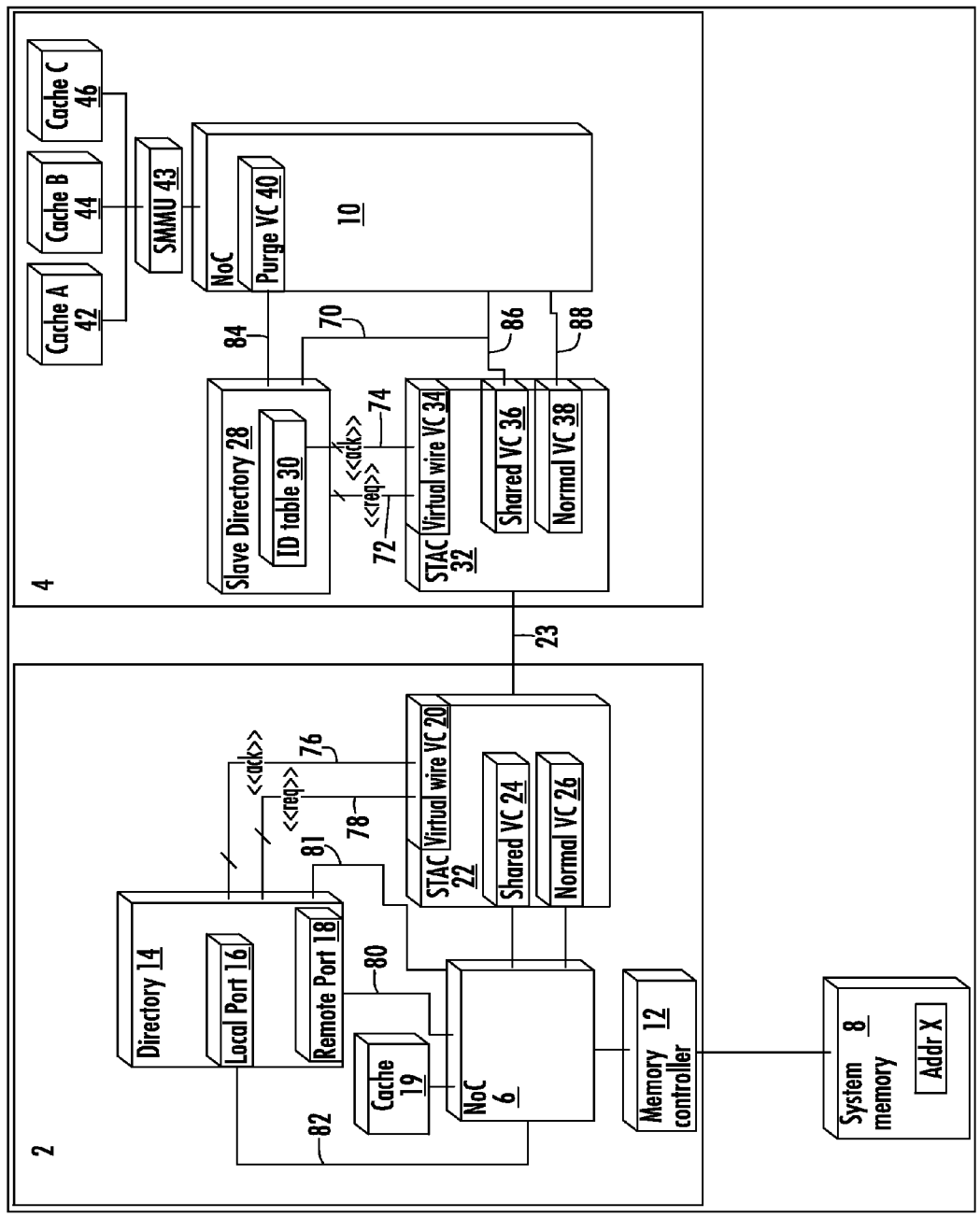
FIG. 1 schematically shows two dies in a package.

Some embodiments may be used where there are more than one die within a single package. In particular, a plurality of integrated circuit dies may be incorporated within a single package. In the following examples, a single package having two dies is described. However it is appreciated that this is by way of example only and more than two dies may be provided in some embodiments in the same single package.

For example, the decreasing feature size in CMOS silicon processes allows digital logic to shrink significantly in successive fabrication technology. For example, an area decrease of 55% may be obtained when comparing a digital logic cell implemented in 90 nanometer technology with a digital logic cell implemented in 65 nanometer technology. However, analog and input/output cells tend to shrink much less, if at all, in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @ 800 MHz or higher on the one hand and higher voltage interconnect technologies, for example HDMI (High Definition Multimedia Interface), SATA (Serial Advanced Technology Attachment), USB3 (Universal Serial Bus), etc. The lower voltage DDR3 interface may require a lower transistor gate oxide thickness as compared to the HDMI technology. This may be incompatible within a standard process.

Porting of high speed analog interfaces to a new process consumes a lot of resource in terms of time and expert attention. By decoupling the implementation of analog blocks from that of digital blocks of the system may allow a reduction in time to working silicon.

By splitting a traditional monolithic system-on-chip into a plurality of dies in order to form a system in package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in different packages. This modularity may reduce design time.

Embodiments may be used where there are two or more dies in the package. Embodiments may be used where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drive specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

In some embodiments, systems are thus built from two or more dies. Each die may have one or more cache memories. In a coherence system using a directory system, there is a centralized table which tracks the protocol state of a memory block and a list of caches which contain a copy of the memory block. The table supports a plurality of caches. In a typical directory system, a cache wishing to access a shared memory block will make a request to the directory for access to that memory block or a line of the memory block. The directory will look up the address and determine the state of the memory block for that address and which, if any, one or more caches have a local copy. Depending on the protocol and the state of the memory block for that address, the directory may send messages to each of the caches holding the memory block to flush or purge the memory for that address and update their local protocol state of the block.

A block is the term for a region of memory which is marked as shared. A line may be the smallest resolution of memory which a cache will read from memory. A block may be greater than or equal to the size of a cache line. So in some cases they may be different and in others the same. For example the number of shared blocks which a directory must keep track of can be reduced by making the block size large. An address may relate to one or more lines in a block or a whole block.

Where there is a system and package having two or more dies, and at least one cache is provided on each of the dies, a cache coherence system will require transactions to be sent on the link between the two dies. In some embodiments, it is desirable to minimize the traffic between the two dies. This may be because the links between the dies may have a lower capacity as compared to, for example, an on-chip link. In such an embodiment, the coherence system transactions sent across the link according to the protocol mentioned above may consume a higher percent of the link capacity as compared to that of an on-chip link. This could, in adverse circumstances, result in a collapsing of the link or a relatively high latency in the link.

It should be appreciated that there may be alternative or additional reasons for minimizing traffic between the two dies.

Accordingly, some embodiments may provide a cache coherence system where there are a plurality of dies, each die having at least one cache memory. The coherence traffic between the dies may be reduced as compared to a conventional directory system.

In some embodiments, the dies in the system may be designed independently as mentioned previously. In some embodiments, the directory scheme may be supported even when the number of caches on a die is unknown.

Reference is made to FIG. 1 which schematically shows two dies which are linked together. These two dies may be included in a system in package.

The first die 2 can be considered as a "master" die for the purposes of cache coherency of the memory locations accessed via the memory controller 12. If there is another die in the system with a memory controller there will be another main directory associated with that on that another die. The master die 2 has a memory controller 12. The memory controller 12 is arranged to interface with a system memory 8. The system memory 8 may be external to the first die but is controlled by the memory controller 12 of the first die. In alternative embodiments, the memory 8 may be part of the first die. The memory controller 12 is arranged to communicate with other entities on the master die 2 via a network-on-chip NoC 6. It should be appreciated that any other communication network can be used can alternatively or additionally be used.

The network-on-chip 6 is arranged to interface with a cache directory 14. In particular, a first communication path 80 is provided between the NoC 6 and a remote port 18 of the cache directory. A second communication path is provided between the NoC 6 and a local port 16 of the directory. The cache directory 14 is the master cache directory and will be described in more detail later.

The network-on-chip is also coupled to an interface 22. The interface 22 is arranged to send communications to the second die 4 via link 23 and to receive communications from the second die 4 via that same link. The interface 22 has a shared virtual channel 24 and a normal virtual channel 26, both of which have communication paths with the NoC 6. The interface has a virtual wire virtual channel 29 which is coupled to one or more request wires 78 and one or more acknowledgement wires 76. These request and an acknowledgement wires 76 and 78 are coupled to the master directory 14.

The first die has a cache memory 19 which has a communication path with the NoC.

It should be appreciated that more than one cache memory may be provided on the first die 2. The cache memory is controlled by a memory management unit.

The second die 4 can be regarded as a "slave" die with respect to cache coherency for the memory accessed via the first die. The second die comprises a network-on-chip 10. The network-on-chip 10 provides a communication network. Again, any other suitable communication network may be alternatively or additionally provided. The network-on-chip is coupled to a first cache memory 42, a second cache memory 44 and a third cache memory 46. It should be appreciated that embodiments may be used where there are one or more caches on the second die, although in this example three cache memories are shown. The caches are managed by a memory management unit 43.

The slave die 4 has a slave directory 28. This slave directory will be described in more detail later. The slave die 4 also has an interconnect 32. This interconnect is coupled to the link 23 and is thus able to transmit to the first die and to receive transmissions from the first die.

The interface has a shared virtual channel 36 which is coupled to the NoC via communication path 86 and a normal virtual channel 38 which is coupled to the NoC 10 via communication path 88. The interface also has a virtual wire virtual channel 34 which is coupled to one or more request wires 72 and one or more acknowledgement wires 74. These request and acknowledgement wires 72 and 74 are coupled to the slave directory 28.

A purge virtual channel 40 is provided by the NoC 10 and has a communication path 84 with the slave directory 28.

Some embodiments provide a modified cache coherence protocol which indicates state changes from the master directory 14 in the first die 2 to the slave directory 28 on the second die. In general terms, an allocation system is provided which allows an arbitrary number of cache memories on the second die and thus local to the slave directory to share a fixed allocation of reserved cache IDs within the master directory. In this way, the need to know the how many cache memories are provided on the slave die is avoided. The need to know the initiator source ID of the cache memory may also be avoided.

In the arrangement shown in FIG. 1, the coherence system and protocol are used on each of the die. The protocol is managed by the master die which has the memory controller for the memory region being shared by the dies. In one embodiment, a standard cache coherence protocol such as MESI or MOESI (modified owner exclusive shared invalid) protocol can be used for the local cache memory. In other words, the cache memory 19 on the master die will operate generally as usual.

The master directory 14 will use a modified protocol for the cache memories on the slave die. A cache memory on the slave die will either have a cache block in the M or I states. The M state is the modified state. A cache block having the modified state holds the most recent, correct copy of the data. The copy in the main memory may be stale and no other cache holds a copy of the data. The cached data may be modified as required. Since the memory block is moved to the M state when a cache on the slave die reads the data, the data can be modified without the need for further cache coherence transactions, reducing bandwidth on the link.

The I state is the invalid state. The cache line in the invalid state does not hold a valid copy of the data. Valid copies of the data might either be in the main memory or in another cache.

A read to any shared block from a cache on the slave die automatically moves the status of the memory block to the M state regardless of the previous state of the block. Any read to a block marked as M and owned by a cache on the slave die results in a purge command for that block being sent to the second die and the subsequent transition to the I state for the entry for that block of the cache in the directories.

The slave and master directories communicate via the respective interfaces 22 and 32 and the link there between. This communication path is used to indicate M to I transitions between the master directory and the slave directory.

In some embodiments virtual channels are used between the two dies. The normal virtual channel is for memory requests from a remote cache (ie a cache on a die different to the die having the memory controller for the memory being accessed) for a memory location which is not shared. Some memory locations have the potential to be used by two or more caches. Information about which memory locations are potentially shareable is stored in the memory management units. The shared virtual channel is for any memory request from a remote cache for a memory location which is potentially shareable, regardless as to whether or not the memory location is currently being used by another cache. The memory transactions from the shared virtual channel and the normal virtual channel on one die may be packetized and put onto a shared link between the dies. The receiving die will separate the received packets and put them onto the respective shared or normal channel.

There are a number of request wires from each of the master directory and the slave directory. The information on these request wires on one die is bundled into a packet by the virtual wire channel and put onto the shared link, with the memory transaction packets. When the packet with the information from the request wires is received by the other die, the packet is de-bundled by the virtual wire channel and the information put onto the respective request wires. There is generally a one to one relationship between request wires on one die and the request wires on the other die.

Similarly there are a number of acknowledgement wires from each of the master directory and the slave directory. The information on the acknowledgement wires is treated in the same way as for the request wires.

The virtualization of the channel means that the number of wires which need to be provided by the link 23 may be reduced.

Figure 2:
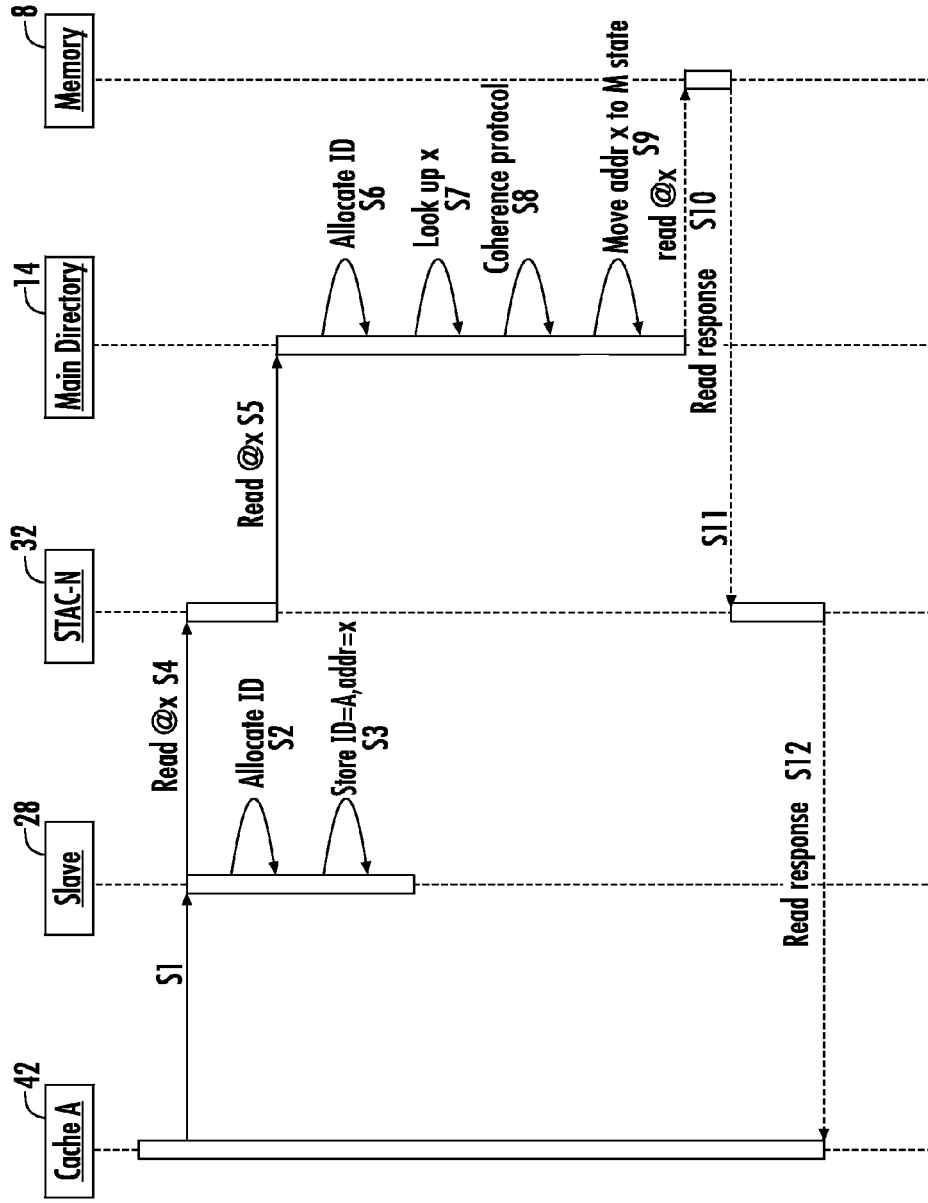
FIG. 2 shows a sequence of operations for a cache on one of the dies of FIG. 1, requesting access to a memory location associated with the other of the dies of FIG. 1.

Reference is made to FIG. 2 which shows a method where the first cache 42 on the second die requests access to memory location (address) x of the system memory 8.

The first cache memory 42 of the second die 4 issues in step S1 a request to read memory location x. The memory management unit 43 will check the address x to see if the address is one which may be shared. In this case, it is determined that the memory request is a shared memory request. That request is received by the slave directory 28. The request is received via the network-on-chip 10 and paths 86 and 70 from the network-on-chip to the slave directory.

In step S2, the slave directory 28 allocates a cache ID to the cache transaction. This occurs in step S2. The algorithm which allocates the cache ID is the same as a corresponding algorithm in the master directory and is synchronized therewith. The allocation of the cache ID will be described in more detail later.

In step S3, the allocated cache ID is stored in the table along with the address (x) and the actual identity of the cache memory. This information is stored in the ID table 30 of the slave directory.

In step S4, the interface 32 receives the request. In practice, the request which is routed on path 70 is also routed to the shared virtual channel 36. This is because the memory transaction relates to a memory address which may be shared.

In step S5, the interface 32 forwards the request to the master directory. In particular the shared virtual channel 36 may packetize the transaction and put it onto the link. The interface 22 on the first die will de-packetize the transaction to put it onto the shared virtual channel 24. From there, the memory transaction is passed to the NoC 6 which routes the request to the remote port 18 of master directory.

In step S6, the master directory 14 will allocate a cache ID to the request. The master directory runs the same algorithm as the slave directory and according allocates the same cache ID to the transaction as was allocated by the slave directory. The requirement to allocate a cache ID may be based on, for example, the port on which a request arrives or by a tag in the request packet. In some embodiments, requests from a cache on the master die do not have a further cache ID: only a request which comes from the slave die will have a cache ID be allocated in addition to the actually identity of the cache memory. For example, the request packet may have a source ID field and this may be used to identify that the request has come from a remote die or this may be indicated by the receipt of the transaction at the remote port. The request from the cache on the second die will be assigned one of the IDs which have been reserved for the cache memories on the second die. It should be appreciated that in some embodiments, where a given cache on the second die makes more than one request to the memory, the master directory may assign a different cache ID for each access request.

In step S7, the master directory 14 will look up address x in the table of the master directory. This is to see if another cache has retrieved the data from this address.

There will be an entry for the block which contains the address. The protocol will depend on the state of that entry. In step S8, the master directory will perform the coherence protocol.

In step S9, as a result of the coherence protocol, the master directory will move address x to the M state for this particular request. The table in the master directory will be described in more detail later. The structure in the master directory may be different to that of the slave. The master directory will contain an entry for each cache ID which marks the state of that block for that cache ID. In step S9 the entry for address x will mark the allocated cache ID as having the line in the M state and all other cache IDs in the I state.

In step S10, the read request is passed to the memory 8. The read request is output via connection 81 to the NoC 6 and from the NoC to the memory controller which accesses the required address of the memory.

In step S11, the read response is returned to the memory controller 12. The memory controller 12 forwards the response to the network-on-chip which provides the response to the interface 22. In particular the response will be put onto the shared virtual channel where the response may be packetized for transmission across the link. The received packet is de-packetized by the shared virtual channel 36.

In step S12, the response is then sent via the network-on-chip 10 to the first cache 42.

Figure 3:
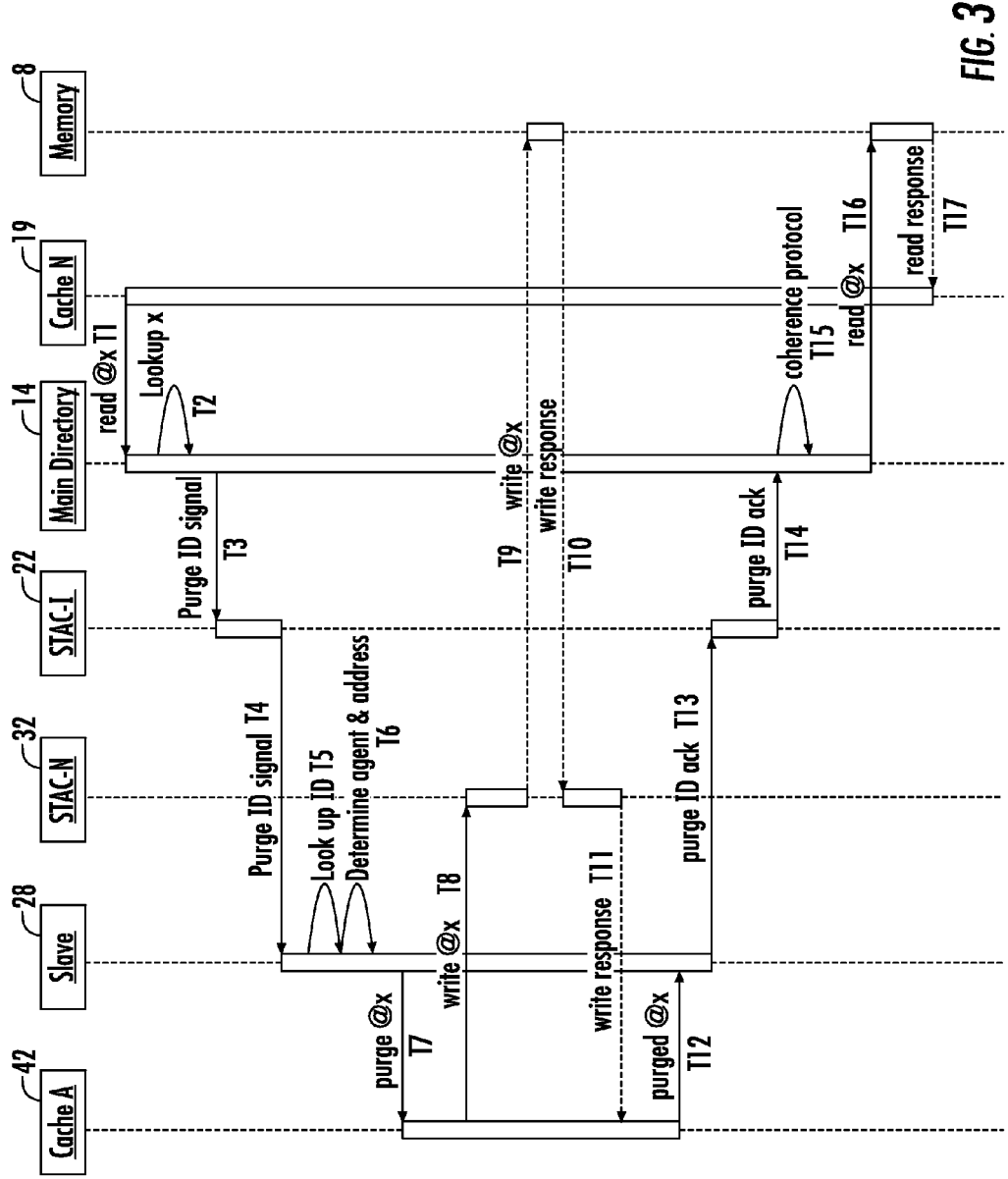
FIG. 3 shows a sequence of operations for a cache which is on the same die which controls the memory location which the cache is seeking to access.

Reference is made to FIG. 3 which shows the sequence of operations for the cache 19 on the first die which requests access to memory location x which is currently owned by the first cache 42 on the second die.

In step T1, cache 19 issues a read request for address x. The memory management unit will note that this request relates to a potentially shared memory location and so the read request is sent to the master directory 14 via the network-on-chip. In particular, the request from the cache 19 is provided by the network-on-chip 6 to the local port 16 of the master directory 14 via communication path 82.

The master directory 14 in step T2 looks up address x. The master directory 14 will note that the memory block associated with address x is currently owned by the first cache 42 on the second die.

In step T3, the master directory 14 issues a purge ID signal which will contain information as to the entry which is to be purged. This will be issued by one or more the request wires. In one embodiment, a request wire is provided for each allocatable cache ID. To purge an entry relating to a particular allocatable cache ID, a signal is asserted on the wire which is associated with that cache ID. The request wires are received by the virtual wire channel 20 of the interface. The virtual wire channel 20 will put the information on the wires into predetermined positions in a packet and put that packet onto the link. That packet is received by the virtual wire virtual channel 34 of the interface of the second die 32 which takes the information received and put the respective information on the respective request wires 72.

The slave directory 28 will thus receive information from the request wires as to which allocated cache ID is to be purged. This is determined by determining which request wire associated with a particular purge ID is asserted. The slave directory 28 is configured in step T5 to look up the allocated cache ID of the purge signal.

In step T6, the slave directory 28 is configured to determine the cache memory and address associated with the allocated cache ID of the purge signal. This is obtained from the table 30 stored in the slave directory.

In step T7, the slave directory 28 issues a purge command to the purge virtual channel 40 for address x to the first cache memory 42.

The cache memory 42 will issue a write request in step T8 which is provided to the interface 32. This may be routed via the network-on-chip. In one embodiment, the write request is put onto the normal virtual channel 38 (as it is a write request). In alternative embodiments the write request is put on the shared virtual channel. The write request is put by virtual channel onto the link 23 and received by the corresponding virtual channel on the first die. The write request is passed from the interface 32 to the memory in step T9. This request thus writes the data which was in the first cache 42 of the second die into address x.

An acknowledgment is sent in step T10—the write response. The write response may follow a generally reverse path to that of the write request and is received by the first cache memory 42, in step T11. The write response may follow a reverse path to the write request.

In step T12, the entry for address x is purged from the first cache memory 42 and notification of this is sent to the slave directory 28 via the purge virtual channel 40 and communication path 84.

In step T13, the slave directory 28 sends a purge ID acknowledgment signal to the interface 22 of the first die via the respective acknowledgement wire. As with the request wires, one acknowledgment wire is provided for each cache ID. When a purge operation has been successfully carried out for a particular allocated cache ID, the respective wire for that allocated cache ID is asserted. The virtual wire virtual channel 34 will put the information from acknowledgement wires into predetermined positions in a packet. The packet is put on the link and the information is extracted by the virtual wire virtual channel 20 on the first die.

The virtual channel 20 will put the extracted information onto the respective corresponding acknowledgment wire 76 which is received by the slave directory 28 in step T14. The corresponding acknowledgment wire will be asserted to indicate that the cache has purged its copy of the data.

The master directory mark the entry for the first cache memory and address x as invalid I in step T15. This responsive to the acknowledgement.

In step T16, the master directory 14 will issue a read request to the memory 8 for location x. This may be via communication path 81.

The response to that read request is sent to the cache 19 in step T17.

Thus, in some embodiments, the purge signalling is carried via so-called virtual wires between the interfaces 22 and 32. Instead of having dedicated wires across the link, a signal in a virtual wire is communicated via the interface and associated circuitry such that there is a corresponding signal change on a corresponding wire on the other side of the link. This may be functionally transparent to the entities which communicate using this wire.

In one embodiment, the memory transactions may be carried by, for example, a sequence of packets across the link 23. Additionally, various control signals are bundled into packets to transmit across the link (virtual wires). However, it should be appreciated that this is by way of example only and any suitable method and/or circuitry may be used to communicate across the link.

In particular, these virtual connections are used to indicate the M to I transitions between the master directory and the slave directory. In other words, if it is determined that a particular entry is to transition from the M to the I state, the master directory, which controls this will send information about this change in status to the slave directory. This is via the request wires and is, for example, as described in relation to FIG. 3.

In one embodiment, the coherence protocol requires that a particular cache ID, which is reserved for the caches on the second die, may have at most one block in the master directory in the M state. The master directory enforces this aspect of the protocol by issuing a purge command to the slave directory when it determines that a remote cache ID is requesting coherence access to a new block.

Some embodiments allow dynamic mapping between the cache memories of the second die and the cache identities. For example, a particular cache memory on the second die may make a plurality of requests to different addresses of one or more shared memory blocks. The master directory will assign a different remote cache identity for each access. This is one of the reserved cache identities for the cache memories of the second die. Thus, in one embodiment, a reserved cache identity will map to only one cache memory access.

In an alternative embodiment, the directory may have a number of IDs and one of those IDs is allocated to each cache memory and that cache ID can then be used for all of the requests from that particular cache. For example, cache A may be given cache identity K in the main directory and all requests are given that identity.

The interconnect on the second die and the die-to-die interfaces route the requests to shared memory in a way that ordering is preserved between the transactions. This may, for example, be done on a single virtual channel defined in the link 23. For example all requests to a potentially shared part of the memory are put onto the shared virtual channel. The packets are passed across the link and received by the shared virtual channel on the other die. The transactions will be kept in the same order in which they are issued.

The slave directory is configured to observe the requests which are passed to it from the cache memories. This allows the slave directory to track the requests by the cache memories of the second die into the main directory.

The slave directory uses the same algorithm that is used in the master directory to assign the cache ID. The algorithms are synchronized. In this way, the slave directory will maintain a mapping of the relationship between the cache IDs of the requests from the cache memories of the second die within the directory, which memory block is being accessed and of course the identity of the cache memory itself. Once a request is issued by one of the cache memories on the second die, an entry corresponding to the resultant cache identity allocated for that transaction is populated with the address being accessed as well as the identity of the cache memory making the request.

Reference is made to FIG. 4 which shows the table stored in the slave directory. For each entry in the table, there is an allocated directory cache ID. The second entry is the address which is to be accessed. The third entry indicates from which cache on the second die the request originates. The final entry indicates the state of the entry. In the example shown in FIG. 4, the first line has a request for memory address x, the request has been allocated cache ID 1. The request came from the first cache memory (cache A). The entry has the state M. The remaining cache identities which can be allocated, have not been allocated so each of the remaining entries have state I.

When the master directory receives a transaction which causes the master directory to change an entry for a memory block in the M state to the I state, and that entry is assigned to a cache memory on the second die, the slave directory is notified which entry in its table to purge by the virtual wire connection.

It should be appreciated that the master directory will know which entries are associated with the second die from the cache ID which has been assigned to that entry.

Reference is made to FIG. 5 which shows examples of master directory entries. Reference is first made to FIG. 5a which shows the format of an entry. There is a first field which indicates the protocol state. The second field will have information to identify the block or line in the memory—for example the address. The third field has one bit for each of the cache memories on the master die—these are the local cache IDs. There are also a set of IDs for use by transactions from the slave die, as already described. These are the allocatable cache IDs.

Reference is made to FIG. 5b which shows an entry for address x. The protocol state is I and as can be seen all the cache bits are set to zero. This means that no cache has accessed block x.

Reference is made to FIG. 5c which shows the entry for address x where the protocol state is E. The E state is the exclusive state and is where a cache line is present only in the current cache but it matches the main memory. In other words, the cache entry is clean. As can be seen, one of the cache bits is a one, indicating that a cache on the master die is requesting access to the memory. The position of the bit which is set to one provides an indication as to which cache is requesting access to address x. It should be appreciated that all the other cache bits are set to zero.

Reference is made to FIG. 5d which shows the entry for address x where the protocol state is changed to the S or shared state. This state indicates that the cache line may be stored in other caches on the master die and is clean, that is it matches the main entry. In this case, a second local cache (that is on the master die) has also requested access to memory x. Thus two of the cache bits for local cache IDs are set to one and the rest of the bits are set to zero.

In FIG. 5e, a cache on the slave die reads from block x. All other copies of the cache are invalidated. This means that any other cache ID is set to zero, other than that which has been allocated to the cache on the slave die. The protocol state is set to the M state.

In FIG. 5f, a second cache on the slave also wants to read the data at address x. The first cache on the slave die which previously requested access to address x has its entry invalidated (the bit associated with the allocated cache ID for the first slave cache transaction is set to zero). The protocol state is again M. The bit which is associated with the allocated cache ID is set to one, all other cache ID bits being set to zero.

In FIG. 5g, a cache on the master die reads from block x so the cache on the slave die has its entry invalidated. The protocol state is set to E. In some embodiments, the S state is not possible if one or more entries is from an cache on the slave die.

In one embodiment, there may be one-to-one mapping between the remote cache IDs and the virtual wires or an encoding scheme may be used. For example, it may be considered that there is one virtual wire for each of the reserved cache IDs. A bundling mechanism is then used to bundle the signals on the virtual wires into a packet which is sent across the link. In alternative embodiments, an encoding scheme may be used in order to provide this information across the link.

The information which is received by the slave directory allows a slave directory to consult the table and issue a purge request to the respective cache memory indicating that the memory block in that cache memory should be invalidated. This may require the writing back to the memory of that data if necessary. This is generally as described previously in relation to FIG. 3. Thus, the purge request may take the form of a transaction sent on the network-on-chip on a virtual channel dedicated to coherence transactions.

The transaction may take any suitable form. In one example, the transaction may indicate that the transaction comprises a purge command and may also have a field indicating which memory block is to be purged.

In alternative embodiments, a dedicated interface may be used for example a bus or point to point wired link which is used, possibly exclusively, for purge commands to the caches.

As illustrated in FIG. 3, when the purge has been completed and any necessary dirty data has been written back to the memory block, the cache memory responds to the slave directory indicating that the purge has been completed and the system memory has been updated.

In embodiments, if the cache blocks relating to the memory block being purged are marked as clean, the cache may simply invalidate the lines and respond to the slave directory immediately. When the slave directory has received the purge acknowledgment from the cache memory, the slave directory will indicate over the virtual wire interface that the purge is complete. The main directory is thus able to continue with the remainder of the coherence protocol for changing the ownership of the particular memory block.

In some embodiments, the allocated cache memory ID on the slave die may own, at most, one memory block at any one time. In some embodiments, the block should be in the M state. In some embodiments, no other cache memory can retain a copy of that particular memory block. In other words, any other cache memory entries for that memory block will be marked as I or purged. It should be appreciated that the cache memories on the first die will operate as normal. The cache memory identities on the master die can own more than one memory block. That block may be in the M state, the I state or any other states which are available in the protocol.

The slave directory may implement the same cache ID allocation as the main directory. The slave directory may maintain the association between the allocated cache ID, the requesting cache and the requested memory block.

In some embodiments, a shared memory block may be a cache line or larger. An access to any address within the memory block may trigger the coherence protocols.

In some embodiments, the main directory will send purge commands associated with the cache memories on the second die over a virtual wire interface.

The virtual wires may be routed to a slave directory which uses the command as an index into a table containing the cache ID and a block address. The contents of a data table are used to synthesize a purge command to a cache on the same die as the slave directory.

The slave directory may acknowledge the completion of the purge command over the virtual wire interface.

Embodiments have been described in relation to an arrangement where there are two dies. Embodiments may be used in an arrangement where there are three or more dies. A master directory is provided on the die associated with the memory controller and slave directories are provided on each of the dies which require access to the memory.

Alternative embodiments may be used with two integrated circuits with the master directory on one chip and the slave directory on another.

Alternative embodiments may be used to achieve cache coherency between two parts on a single integrated circuits.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An arrangement comprising:
   a first part comprising a memory controller configured to access a system memory, at least one first cache memory and a directory; and
   a second part comprising one or more second cache memories configured to request access to said system memory, the one or more second cache memories including a second cache memory,
   wherein said directory is configured to use a first coherency protocol for said at least one first cache memory and a second different coherency protocol for said one or more second cache memories; and
   wherein said second different coherency protocol is such that when a transaction associated with the second cache memory is in respect of a first address, no cache memory other than the second cache memory is permitted to retain data from said first address of said system memory.

2. The arrangement as claimed in claim 1, wherein:
   the directory is configured to use the first coherency protocol for the at least one first cache memory in response to determining the at least one first cache memory is local to the first part, and
   the directory is configured to use the second different coherency protocol for said one or more second cache memories in response to determining the one or more second cache memories are remote from the first part.

3. An arrangement as claimed in claim 2, wherein said first coherency protocol is configured to have a modified state, an invalid state and at least one other state.

4. An arrangement as claimed in claim 3, wherein said at least one other state comprises an exclusive state and/or a shared state.

5. An arrangement as claimed in claim 2, wherein said directory is configured such that at most one entry for said first address has a state other than an invalid state.

6. An arrangement as claimed in claim 2, wherein said directory is configured to allocate to each cache transaction from said one or more second cache memories one of a set of reserved cache identities used only for transactions from said one or more second cache memories.

7. An arrangement as claimed in claim 6, wherein each allocated cache identity is associated, respectively, with a single corresponding transaction.

8. An arrangement as claimed in claim 2, wherein the directory comprises a first directory, and wherein said second part comprises a second directory.

9. An arrangement as claimed in claim 8, wherein:
   said first directory is configured to use an algorithm to allocate a cache identity for a transaction from the second cache memory, and store said allocated cache identity and address information associated with said transaction, and
   said second directory is configured to use a same algorithm to allocate a same cache identity for said transaction from said second cache memory, and store said allocated cache memory identity, address information associated with said transaction and a true cache identity of said second cache memory.

10. An arrangement as claimed in claim 2, comprising at least one memory management unit comprising information indicating which parts of said system memory are potentially shareable.

11. An arrangement as claimed in claim 2, wherein use of said first or second coherency protocol is triggered in response to detecting a transaction associated with an address in a shareable part of said system memory.

12. An arrangement as claimed in claim 2, comprising a link between said first and second parts, wherein said link comprises a first virtual channel for transactions from the one or more second cache memories to a non-shared part of said system memory and a second virtual channel for transactions from the one or more second cache memories to a shareable part of said system memory.

13. An arrangement as claimed in claim 8, comprising a link between said first and second parts, said link comprising a virtual wire channel configured to carry information between a plurality of wires associated with said first directory and a corresponding plurality of wires associated with said second directory.

14. An arrangement as claimed in claim 13, wherein a first set of said plurality of wires associated with said first directory is configured to send purge information to a second set of said plurality of wires associated with said second directory.

15. An arrangement as claimed in claim 14, wherein a third set of said plurality of wires associated with said second directory is configured to send purge acknowledgment information to a fourth set of said plurality of wires associated with said first directory.

16. An arrangement as claimed in claim 15, wherein at least one set of wires selected from the group consisting of said first, second, third and fourth sets of wires comprises a separate wire for each allocatable cache identity.

17. An arrangement as claimed in claim 2, wherein said first directory comprises a first port for transactions from said at least one first cache memory and a second port for transactions from said one or more second cache memories.

18. An arrangement as claimed in claim 2, wherein said first and second parts comprise, respectively, first and second dies.

19. An arrangement as claimed in claim 2, wherein said second different coherency protocol is configured to have only modified and invalid states.

20. A method comprising:
receiving in a hardware directory a first transaction from a first local cache memory requesting access to a system memory;
in response to determining the first local cache memory is local to the directory, using the directory to apply a first cache coherency protocol to said first transaction;
receiving in said directory a second transaction from a second remote cache memory requesting access to said system memory; and
in response to determining the second remote cache memory is remote from the directory, using the directory to apply a second different coherency protocol to said second transaction.

21. The method of claim 20, wherein a first part includes the directory, wherein a second part includes the second remote cache memory, and wherein the method further comprises:
allocating in the directory, to a cache transaction from the second remote cache memory, one of a set of cache identities reserved for transactions from the second remote cache memory.

22. The method of claim 20, wherein the directory comprises a first directory, and wherein:
using the first directory to apply a first cache coherency protocol to the first transaction comprises using the first directory to apply an algorithm in to allocate a cache identity for the first transaction, and storing the allocated cache identity and address information associated with the first transaction in the first directory, and
the method further comprises: using a second directory to apply the same algorithm to allocate the same cache identity for the transaction, and storing the allocated cache identity, address information associated with the transaction, and true cache identity of said cache memory in the second directory.

23. The method of claim 20, further comprising:
using a link between a first part and a second part to transmit information associated with the second transaction between the first part and the second part, wherein the first part includes the directory and the first local cache memory, wherein the system memory is accessible from the first part, and wherein the second part includes the second local cache memory,
wherein using the link to transmit the information associated with the second transaction comprises: using a first virtual channel of the link when the second transaction is associated with a non-shared part of the system memory, and using a second virtual channel of the link when the second transaction is associated with a shareable part of the system memory.

24. The method of claim 20, wherein:
the directory comprises a first directory,
the method further comprises using a link between a first part and a second part to transmit information associated with the second transaction between the first part and the second part, wherein the first part includes the first directory and the first local cache memory, and wherein the second part includes a second directory and the second local cache memory,
wherein using the link to transmit the information associated with the second transaction comprises: using a virtual wire channel of the link to carry information between a plurality of wires associated with the first directory and a corresponding plurality of wires associated with the second directory.

25. The method of claim 20, wherein determining the first local cache memory is local to the directory comprises determining the first local cache memory and the directory are disposed on a same die.

26. The method of claim 20, wherein determining the second remote cache memory is remote from the directory comprises determining the second remote cache memory and the directory are disposed on different dies.

27. An apparatus comprising:
a component, the component including a hardware directory configured to determine whether a memory transaction is associated with a cache memory local to the component or a cache memory remote from the component,
wherein the hardware directory is further configured to apply a first cache coherence protocol to the memory transaction in response to determining the memory transaction is associated with the cache memory local to the component, and to apply a second, different cache coherence protocol to the memory transaction in response to determining the memory transaction is associated with the cache memory remote from the component.

28. The apparatus of claim 27, wherein the directory is configured to allocate, to a memory transaction associated with the remote cache memory, one of a set of reserved cache identifiers used only for memory transactions associated with remote cache memories.

29. The apparatus of claim 27, wherein the component comprises a first component, wherein the hardware directory comprises a first hardware directory, wherein the apparatus further comprises a second component including a second hardware directory, and wherein:
the first directory is configured to use an algorithm to allocate a cache identifier for a memory transaction associated with the remote cache memory, and configured to store the allocated cache identifier and address information associated with the memory transaction associated with the remote cache memory, and
the second directory is configured to use the same algorithm to allocate the same cache identifier for the memory transaction associated with the remote cache memory, and configured to store the allocated cache memory identifier, address information associated with the memory transaction, and a true cache identity of the remote cache memory.

30. The apparatus of claim 27, wherein the component comprises a first component, and wherein the apparatus further comprises:
   a second component; and
   a link between the first and second components,
   wherein the link comprises a first virtual channel for transactions between the remote cache memory and a non-shared part of the system memory, and a second virtual channel for transactions between the remote cache memory and a shareable part of the system memory.

31. The apparatus of claim 27, wherein the component comprises a first component, wherein the hardware directory comprises a first hardware directory, and wherein the apparatus further comprises:
   a second component including a second hardware directory; and
   a link between the first and second components,
   wherein the link comprises a virtual wire channel configured to carry information between a plurality of wires associated with the first directory and a corresponding plurality of wires associated with the second directory.

* * * * *